United States Patent
Canup et al.

(10) Patent No.: US 8,636,901 B2
(45) Date of Patent: Jan. 28, 2014

(54) TWO PART RESILIENT COMBINATION BOTTOM SUPPORT AND RELIEF VALVE END SEAL ASSEMBLY FOR FLUID FILTERS

(75) Inventors: Travis Canup, Fayetteville, NC (US); Rajan Ahuja, Fayetteville, NC (US); L. Steven Cline, Fayetteville, NC (US)

(73) Assignee: Mann+Hummel Purolator Filters LLC, Fayetteville, NC (US)

( * ) Notice: Subject to any disclaimer, the term of this patent is extended or adjusted under 35 U.S.C. 154(b) by 597 days.

(21) Appl. No.: 12/352,961

(22) Filed: Jan. 13, 2009

(65) Prior Publication Data

US 2009/0178963 A1    Jul. 16, 2009

Related U.S. Application Data

(60) Provisional application No. 61/020,922, filed on Jan. 14, 2008.

(51) Int. Cl.
 *B01D 27/10*    (2006.01)

(52) U.S. Cl.
 CPC .................................. *B01D 27/103* (2013.01)
 USPC ........... 210/130; 210/440; 210/450; 210/430; 137/843

(58) Field of Classification Search
 USPC .......... 210/DIG. 17, 130, 440, 450, 429–430; 137/843, 852, 853–855, 860; 55/313
 See application file for complete search history.

(56) References Cited

U.S. PATENT DOCUMENTS

| | | | |
|---|---|---|---|
| 3,184,062 A * | 5/1965 | Humbert, Jr. | 210/130 |
| 3,339,738 A | 9/1967 | Wilhelm | |
| 3,361,260 A * | 1/1968 | Buckman | 210/130 |
| 3,785,491 A | 1/1974 | Dudinec et al. | |
| 4,144,168 A | 3/1979 | Thornton | |
| 4,820,409 A | 4/1989 | Lowsky et al. | |
| 5,284,579 A | 2/1994 | Covington | |
| 5,833,843 A | 11/1998 | Covington | |
| 5,902,361 A | 5/1999 | Pomplun et al. | |
| 6,136,183 A | 10/2000 | Suzuki et al. | |
| 6,790,356 B2 | 9/2004 | Wright et al. | |
| 6,793,808 B2 | 9/2004 | McKenzie | |
| 6,926,156 B2 | 8/2005 | Wall | |
| 6,936,161 B2 | 8/2005 | Wright et al. | |
| 7,160,447 B2 | 1/2007 | Yates | |
| 7,168,572 B2 | 1/2007 | Nguyen et al. | |
| 2002/0139733 A1 | 10/2002 | Michels et al. | |
| 2005/0242012 A1 | 11/2005 | Cline | |

(Continued)

FOREIGN PATENT DOCUMENTS

JP    2000210507 A  *  8/2000

OTHER PUBLICATIONS

Corresponding International Search Report dated Mar. 10, 2009 (8 pages).

*Primary Examiner* — Terry Cecil
(74) *Attorney, Agent, or Firm* — Crowell & Moring LLP (57) ABSTRACT

A fluid filter is described, comprising a filter body defining a cavity for a filter element, a first end cap for fitting on one end of the filter body, having an integrated single piece anti drain back valve and seal, and a second end cap for fitting on an opposite end of the filter body, having an integrated two part relief valve and supports for the filter element, formed by a relief valve body and a relief valve disc.

24 Claims, 9 Drawing Sheets

(56) References Cited

U.S. PATENT DOCUMENTS

2007/0080105 A1 4/2007 Attassery
2007/0170101 A1* 7/2007 Stanhope et al. ............. 210/130
2008/0060991 A1 3/2008 Gaither

* cited by examiner

PRIOR ART

FIG. 5B

PRIOR ART

TWO PART RESILIENT COMBINATION BOTTOM SUPPORT AND RELIEF VALVE END SEAL ASSEMBLY FOR FLUID FILTERS

CROSS REFERENCE TO RELATED APPLICATIONS

The application is related to U.S. patent application Ser. Nos. 12/038,481, 12/038,498, 61/020,919 and 61/020,924, the contents of which are incorporated herein by reference in their entirety. The present application claims the benefit of the priority date under Jan. 14, 2008 based on the provisional application Ser. No. 61/020,922.

BACKGROUND AND SUMMARY OF THE INVENTION

The present invention is related to a fluid filter having a filter element sealed inside a canister, also called a spin-on type fluid filter. These types of filters are commonly used in lubrication systems of automotive or stationary internal combustion engines that require uninterrupted oil lubrication for moving parts. In these systems, continually filtered oil is supplied through the fluid filter as part of a lubrication circuit.

Figure 5A:
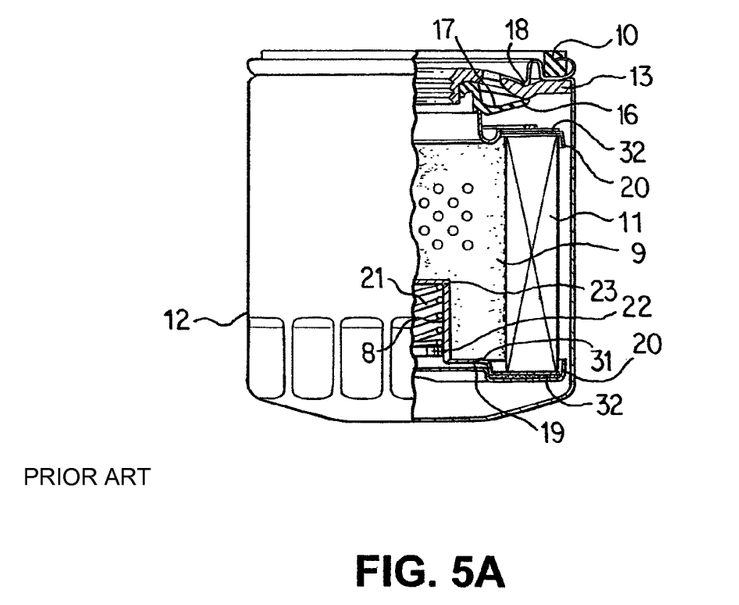
FIGS. 5a and 5b are respectively a top and a side cut-away view showing the components in a conventional spin-on fluid filter.
Figure 5B:
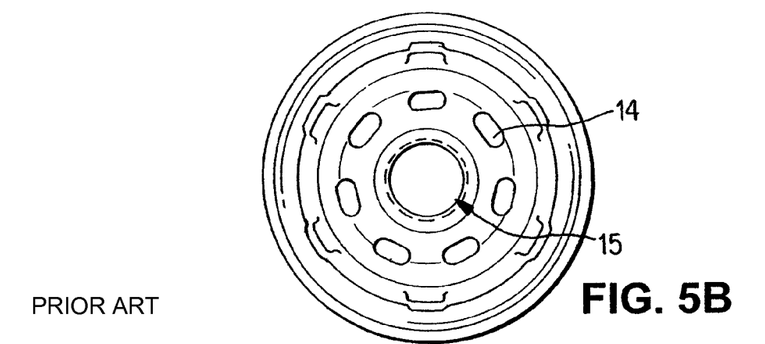

Conventional designs of conventional fluid filters, such as a typical spin-on or canister sealed fluid filters, include components that are made both of metallic and non-metallic materials that support the main function of filtration performed by the filter element housed inside the filter's can. A typical conventional fluid filter assembly is shown in FIGS. 5A and 5B. The filter includes multiple components and parts that have to be assembled in successive steps, resulting in many no-value added processes. These no-value added processes waste resources and increase the cost of the filter.

The conventional filter element may be a media element 11 which has the main function of filtrating the fluid, is housed in a can 12, and is attached to the threaded plate and retainer assembly 13 to provide a mounting arrangement on the mounting base of an engine. The thread plate assembly 13 has inlet holes 14 used to provide the unfiltered or dirty oil to the filter housing, arranged around a bolt circle diameter surrounding the central thread hole 15. The central hole 15 is used as an outlet of clean, filtered oil from the spin-on filter when the engine is operated.

Typically the oil flows to the filter housing under a design pressure and flow rate delivered by the engine's oil pump (not shown). The filter is mounted on a thread stud (not shown) which fastens to the central thread hole 15. The assembly has a conduit path designed to return the filtered oil from the inner core of the filter element back to the moving or stationary parts of the engine that need continuous lubrication under varied operating conditions.

The anti-drain back valve 16 in the conventional design includes a cup shaped rubber cone 17 covering the inlet holes 14 of the thread plate 13, used to help retain the fluid (in this case oil) in the housing/can when the engine is turned off. This is an important requirement when the filter is mounted with the case dome up and the threaded plate downwards, or in any horizontal or other mounting orientation where the oil would normally exit the can by gravity. When the engine starts, the rubber conical flap 17 unseats from the inlet holes 14 due to the force of the pressurized supply of fluid, and allows the flow of fluid into the filter housing.

When the lubrication pump and/or the engine are turned off, the conical round flap 17, which forms the anti drain back valve, seats back on the circumferential seat 18 of the metal threaded plate to prevent the flow of oil from draining out of the filter through the inlet holes. This helps retain the oil or other fluid in the filter housing. Benefits of this feature include preventing the filter from drying out, and air from being trapped in the oil piping. In addition, as the engine is started, the required oil flow is achieved instantly, without any air pockets being formed in the lubrication circuit.

In conventional filter designs currently in production, a filter media element 11 may include a bottom spring support or an element guide 19 to provide sealing of the inlet to the outlet by cushioning the design stack-up tolerances of various assembly components. This may be achieved by using compression spring or element guide type supports, as shown in FIG. 5A. The conventional end sealing cap may be a plastic or metal cap 20 used to seal the filtration element made of filter media 11. The end cap 20 provides a seat for a relief or by-pass valve which includes an assembly of multiple components such as a spiral or compression spring 21, a piston 22 and U-clamp 23 that are welded or riveted to the end cap to hold all the components together. This configuration also allows the relief or bypass valve to function (see FIG. 4) by allowing the fluid to bypass the filter elements if the filter becomes clogged.

End cap assemblies of the can 12 generally include several other components. The described relief valves may be disposed on a thread side (inlet side) of the filter, on the top end caps or on the bottom side caps of the filtration elements. The relief valve is used in the filter element to provide lubrication oil in the event of cold starting conditions, when the engine is turned-on after being off for extended periods of time and the fluid is so thick that it does not flow easily, or when the filtration media becomes clogged by excessive usage or excessive dirt in the oil. The relief valve or by-pass valve opens when a pre-set pressure differential has built-up in the filter, to connect the inlet to the outlet without passing through the filtering media, and prevent lubrication starvation of the engine.

A conventional filter of the spin-on type is generally constructed using the following components, to achieve the desired filtration function. With reference to FIGS. 5a and 5b, the conventional filter includes:
Filter housing 12.
Thread Plate with retainer 13 for assembly with the filter housing 12.
Seal gasket 10.
Filter Media element 11 with supporting Center tube 9.
Anti Drain Back Valve (ADB) 16.
Relief valve (RV) 08.
Bottom support 19.
The following supplementary components that constitute the internal parts and/or assemblies of the conventional filter are also generally required:
Bottom spring/element guide 19.
Relief valve housing 23.
Relief valve spring 21.
Relief valve piston 22.
End cap Bottom/Top 20.
Welding or riveting process for Relief valve assembly 31.
Bonding with adhesive 32 of metal or plastic cap to filter element and thermal curing process thereof.

According to the exemplary embodiments of the invention, the additional components described above are replaced by a single-piece, resilient end elements of the filter. Several manufacturing processes used conventionally to assemble the additional filter components are also avoided, further simplifying and reducing the cost of the process. As will be described in greater detail below, specially shaped integrated components formed from resilient materials, preferably assembled using interference fitting to retain the parts together, define the cap and the bottom support of the filter. In one exemplary embodiment, the end cap may also define the relief valve, an end seal, and a bottom support for the filter media. Another exemplary end cap may define the anti-drain back valve and an end seal.

Other objects, advantages and novel features of the present invention will become apparent from the following detailed description of the invention when considered in conjunction with the accompanying drawings.

BRIEF DESCRIPTION OF THE DRAWINGS

In the drawings:

FIG. 8b is a top view of the first part shown in FIG. 8a;

FIGS. 8c and 8d are perspective views of the first part shown in FIG. 8a;

FIGS. 8h and 8l are perspective views of a two part bottom support-relief valve-end seal according to an embodiment of the invention;

FIG. 8j is a top view of the two part bottom support-relief valve-end seal shown in FIG. 8h;

FIGS. 8k and 8l are respectively a side elevation view and a detail view of the two part bottom support-relief valve-end seal shown in FIG. 8h;

FIGS. 9a and 9b are a side and a top view of a combination anti drain back valve according to an embodiment of the invention;

DETAILED DESCRIPTION OF THE DRAWINGS

Figure 8:
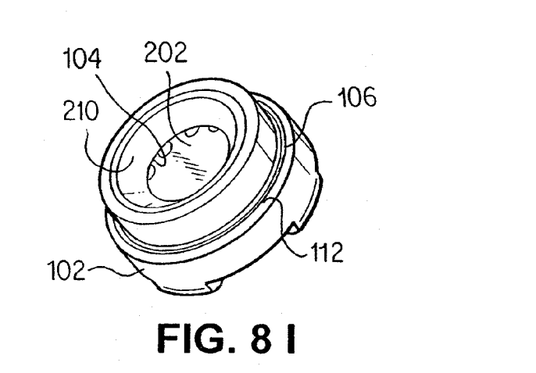
Figure 8A:
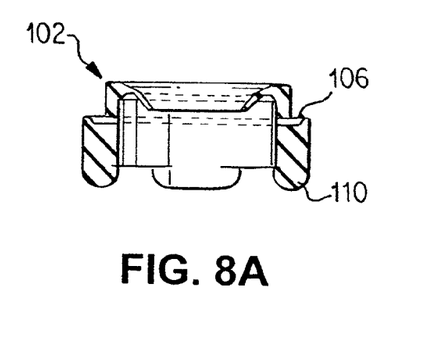
FIG. 8a is a side view showing a first part of the two part bottom support-relief valve-end seal according to an embodiment of the invention.
Figure 8B:
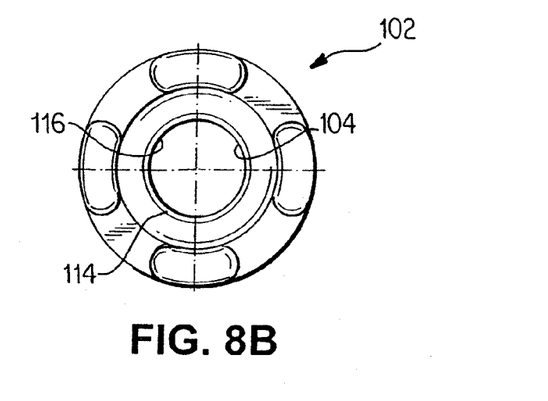
Figure 8C:
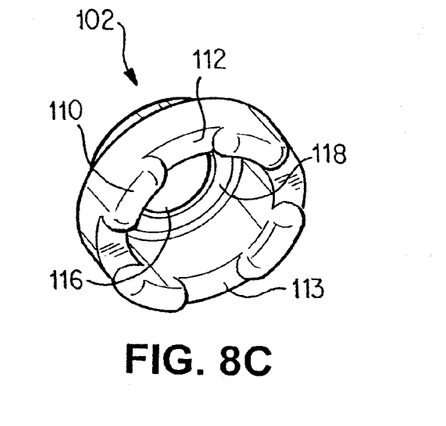
Figure 8D:
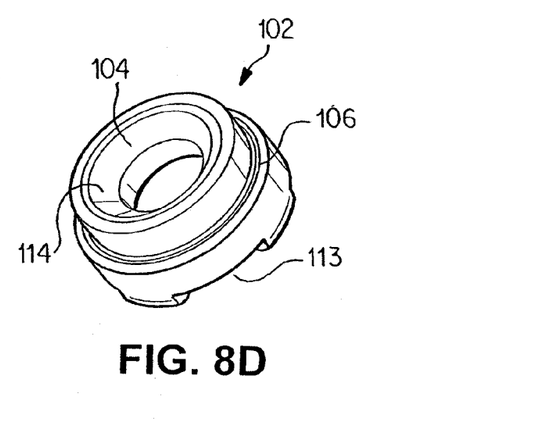

An exemplary embodiment of a two part combination relief valve element according to the present invention is shown in FIGS. 8a-1. This embodiment is shown as a component of a complete oil filter in FIG. 6. A comparison of the components of the filter having components made according to the present invention with a conventional current design oil filter may be made by referring to the conventional filter shown in FIGS. 5A and 5B.

The invention is aimed in part to eliminate the non-value adding parts and processes used in manufacturing conventional filters, and to bring about a simplified assembly. In the present invention, an exemplary fluid filter is radically redesigned to replace various components like the bottom support-guide (spring), end cap, bonding plastisol/glue, relief valve spring, piston, relief valve housing/U-clamp, etc., with a two part combination relief valve element, which integrates the relief valve, the filter element supports and various seals.

The processes involving heating ovens for curing and bonding, welding and riveting processes used conventionally to manufacture the filter are also avoided according to embodiments of the invention. All these parts and processes are superseded by the two part combination relief valve element according to embodiments of the invention. The exemplary two part combination relief valve element may be molded from resilient silicon, nitrile rubber materials, compounded plastisol, polyurethane, resilient polymers or any other compounds and materials having the appropriate properties. A selectable metallic or non-metallic RV disc of desired dimensions may be assembled in the molded polymeric support element to form the two part component.

The exemplary embodiments of the present invention may include a combination bottom support relief valve end seal made of two components, a first part including a molded resilient rubber combination RV body and bottom support-end seal, and a second part including a metallic or non-metallic RV disc assembled separately in the combination body. The first part defining a main body of the exemplary combination may be molded from a resilient material, such as rubber, polyurethane or any other similar compound.

For example, as shown in FIGS. 8a-l, the first part 102 of the two part combination relief valve element 100 may include a sealing element 112 disposed on a ledge 106, adapted to seal the filter element inlet to outlet preventing flow from the inlet to the outlet around the two part combination relief valve element 100. Also included may be a conical RV lip seal 104 to selectively close the holes 206 of the RV disc 204, to form the two part relief valve. The dimensions of holes 206 may be selected for best performance. Also included are bottom support lugs 110 adapted to support the filter media element 11. The lugs 110 define circumferentially uniformly distributed openings 113 to pass the flow of lubricating fluid or oil. In one exemplary embodiment, the lip seal 104 may extend to match the same plane as the bottom of the support lugs 110. Alternatively, the edge of the lip seal may have a positive or negative offset relative the plane of the support lugs, for example to vary the opening pressure of the relief valve element 210.

According to embodiments of the invention, the integral circular/conical shaped inverse cup elements 114 may be provided to help close the back relief valve when not in function. An oil retention circumferential pocket 116 is provided to initiate the relief valve opening without any resistance at designed pressure ratings.

The retention area in the molded first part 102 of the two part combination relief valve element 100 helps in providing a seat 118 for the RV disc 204 of the second part 202, and also prevents locking of the RV disc 204 with the rubber lip after dry or prolonged non use. The retention area may also be used to hold the oil as it is retained in the filter as an anti-drain back function and prevents locking up of the relief valve lip with a metallic or non metallic RV disc.

The exemplary end cap of the filter element is sealed to the filter body or can 12 when the relief valve portion 210 of the two part combination relief valve element 100 is not allowing fluid to bypass the filter media 11. The entire assembly of the two part combination relief valve element 100 may be carried out by interference fit, without the need for any thermal glues or bonding processes, and with a minimal number of parts that have no direct function or added value for the desired filtering function.

The beneficial aspects of the present invention include the ability to combine all required functions in the two part combination relief valve element, while additional components like bottom spring/element guide and end caps that contribute to the non-value adding processes and components, virtually can be eliminated according to the present invention, by combining multiple components into a single two part component. This single two part component, such as the exemplary two part combination relief valve element 100, uses interference fit by snug tolerances for achieving a positive locking/sealing effect, and thus avoiding any additional thermal bonding processes.

The exemplary component and process facilitates the elimination of a majority of non-value adding materials, components, processes and labor costs that are a burden on conventional filters. In addition, more components adds to the stacking up dimensional errors due to accumulation of multiple manufacturing tolerances stemming from each individual part. This problem can be greatly reduced by a simpler manufacturing process and process controls, and by elimination of parts, so that fever cumulative dimensional errors are present.

The exemplary filter media 11 may be a self-contained filtration body of media pleats sealed between themselves, as conventionally used in air filter elements. This combination virtually has better flow properties for oil than with end capped filter which benefits oil filter elements to have minimal resistance to flow and provides better flow characteristics than a conventional oil flow filter.

A explained above, the number of components including the bottom spring support or element guide, end cap and relief valve components and assembly are all integrated to form the exemplary two part combination relief valve element 100. The first part 102 of the two part combination relief valve element 100 may be molded from types of resilient materials, such as resilient polymers. The second part 202 of the two part combination relief valve element 100 may include an exemplary RV disc 204 which may be made from metallic or non-metallic materials. The assembly according to embodiments of the invention eliminates about 6 to 7 components, as listed above, and the related manufacturing processes and non value added tasks necessary to assemble them. An additional benefit is that inventories of components for manufacturing the two part combination relief valve element may be reduced to only two parts which are assembled together by interference fit.

The exemplary two part combination relief valve element 100 may be assembled on the sealed/hot-glued pleated element pack using the designed interference tolerances. The special contoured circumferential sealing ledge 106 with sealing element 112 may be disposed around the perforated center tube 9 of the filter. The exemplary two part combination relief valve element 100 is also adapted to seal off the clean side (normally inner side) from the dirty side (normally outer) of the oil passages, during normal operation when the fluid does not bypass the filtering media 11.

The support lugs 110 of the present exemplary embodiment, support the filter element assembly in the housing, and may be formed of materials that have the resilient properties of rubber, silicon, nitrile or any other rubber compounds and materials. Flow passages 113 may be formed between adjacent lugs 110. The sealing element 112 disposed on ledge 106 of the two part combination relief valve element 100 seals the filter element to separate the clean side from dirty side of the filter element, i.e. the inside from the outside.

Figure 3:
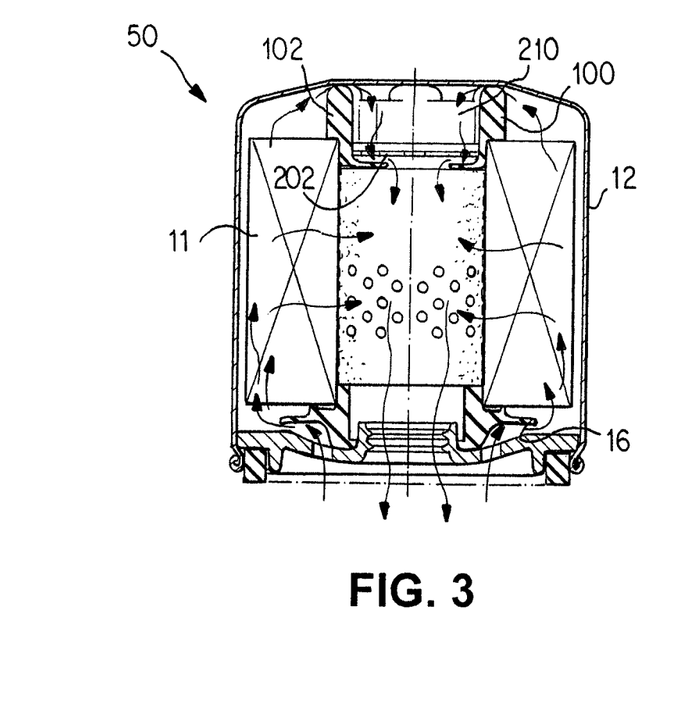
FIG. 3 shows a diagram of the oil filter shown in FIG. 1 in an opening condition of the relief valve, under partial restriction conditions.
Figure 4:
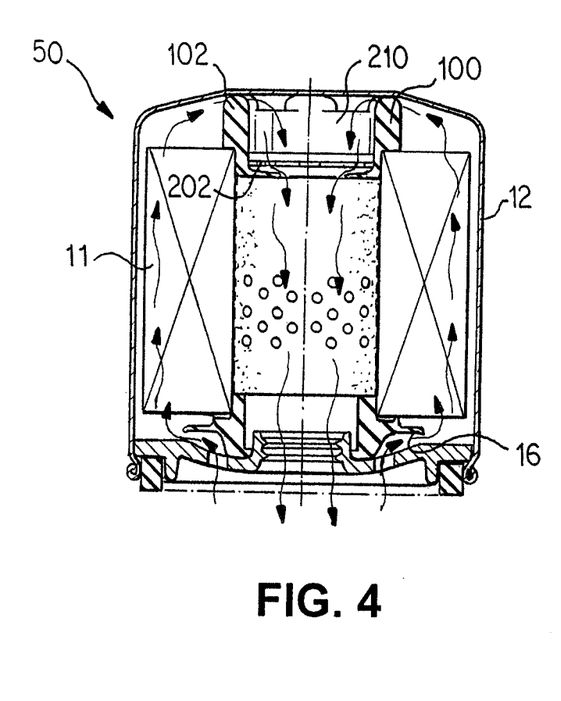
FIG. 4 shows a diagram of the oil filter shown in FIG. 1 with the relief valve lip giving way to allow oil flow under differential pressure built-up conditions.

When a pre-selected design pressure differential is reached across the two part combination relief valve element, the relief valve portion's 210 sealing lip 104 gives way and lifts from sealing contact with the case, and opens thus causing the by-pass or relief valve portion 210 to allow fluid to bypass the filter media 11. The relief valve may be designed to open up under partial or full restriction flow conditions, as is shown in FIG. 3 and FIG. 4, and as will be described in greater detail with reference to FIGS. 10a-10c. For example, the relief valve portion 210 of the two part combination relief valve element 100 may be designed to have a range of openings from fully closed to fully open as a function of the differential pressure.

The relief valve sealing lip 104 is seated and seals the inlet from the outlet (also called the clean side to dirty side) under normal conditions, such as when the differential pressure across the two part combination relief valve element 100 is below the pre-set design pressure. For example, the pre-set design pressure may correspond to a desired specific degree of restriction through the oil filter.

FIGS. 1 to 4 show the functioning of an exemplary embodiment according to the present invention of a filter having the two part combination relief valve element 100. The exemplary filter has a combination-bottom support with the two part combination relief valve element 100, and an anti-drain back valve 16, which may be of conventional design, for use in a spin-on fluid filter 50.

Figure 1:
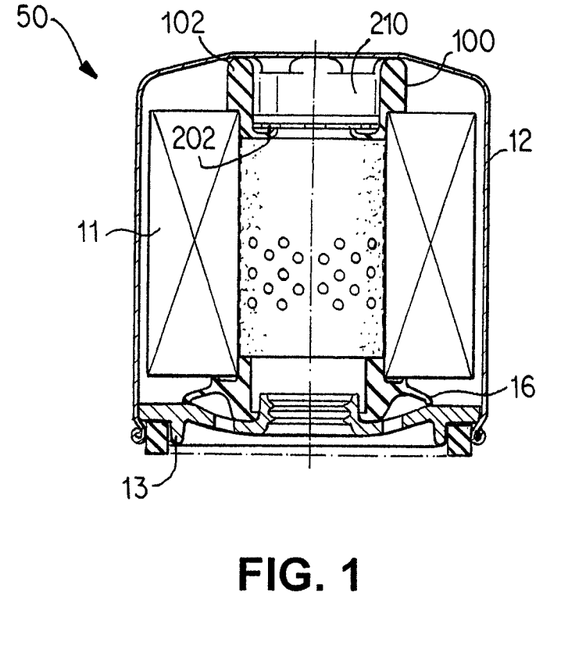
FIG. 1 shows a diagram of a no oil flow condition, or engine off-pump off condition of an oil filter for an internal combustion engine that requires an anti drain back valve.
Figure 2:
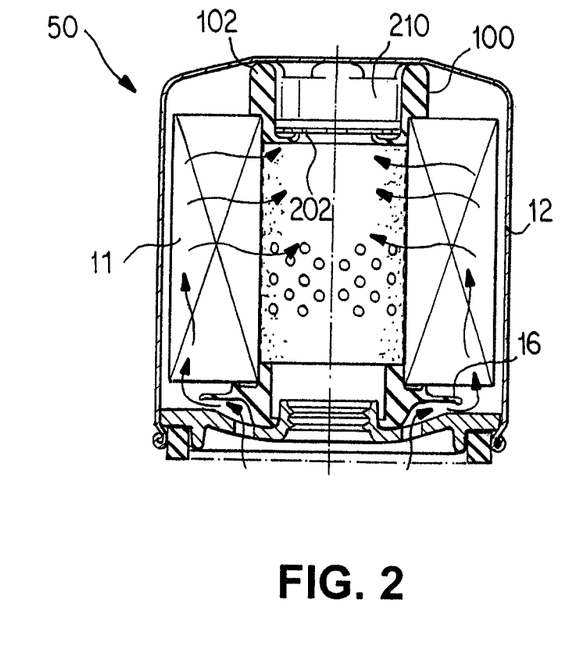
FIG. 2 shows a diagram of the oil filter shown in FIG. 1 in a normal oil flow condition when engine/pump are operating.

More specifically, FIG. 1 shows a no oil flow condition, or engine-off-pump off condition. FIG. 1 shows a dome-up view of the can 12 with thread plate 13 facing downward for fastening on a mounting base of an internal combustion engine (not shown). Both relief valve and anti-drain back valve are closed in this condition. FIG. 2 shows a normal oil flow condition when the engine/pump are operating. Oil enters in the filter can 12 via inlet holes 14 as the anti-drain back valve lip 16 gives way (opens-up) under normal operating pressures, and dirty oil get in the filter housing. The relief valve portion 210 is closed, and clean Oil comes out of the filter through the threaded stud outlet 15 on the mounting base 13. Flow curves in the figures indicate the direction of flow in the filter.

FIG. 3 shows the opening condition of the exemplary relief valve portion 210 of the two part combination relief valve element 100, under partial restriction conditions. FIG. 4 shows the relief valve sealing lip 104 giving way for oil flow by lifting from the filter case bottom, under a differential pressure existing across the filter that is greater than a pre-selected differential pressure. The pre-selected differential pressure above which the relief valve portion 210 opens may correspond to a desired level of restriction through the filter.

Figures 6, 6A, 6C:
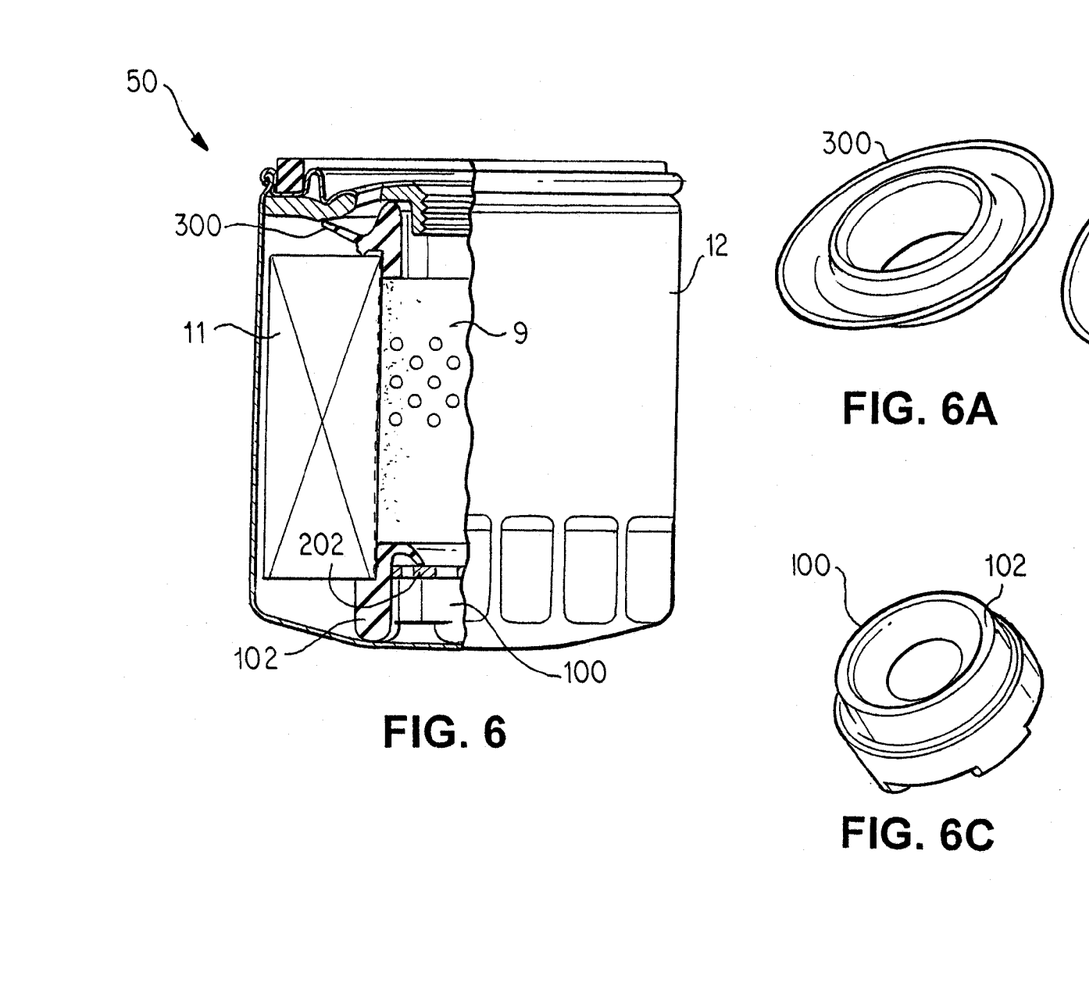
FIG. 6 is a side cut-away view showing a spin-on fluid filter according to an embodiment of the present invention, including a two part bottom support-end seal with relief valve and a combination anti-drain back valve with end seal.
FIGS. 6a-d show perspective views of the top and bottom elements according to the invention shown in FIG. 6.
Figure 6B:
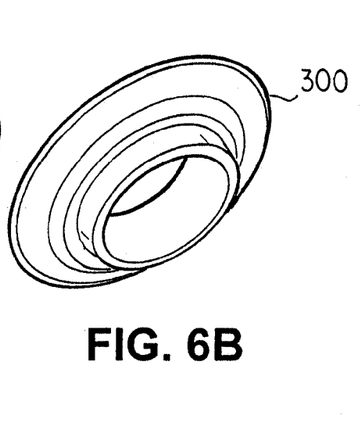
Figure 6D:
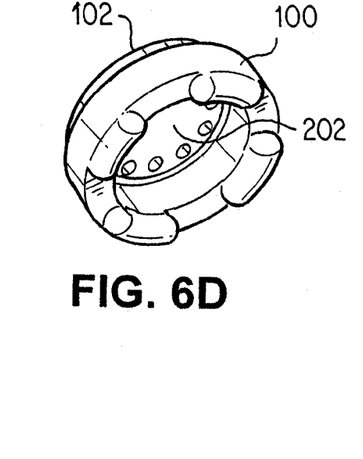

FIG. 6 shows an exemplary spin-on fluid filter according to the present invention, which includes the two part combination relief valve element 100, and also a combination anti drain back valve 300 with end seal. FIG. 6 can be compared to FIG. 5A to note the reduction in parts brought about by the embodiments according to the invention. FIGS. 6a-b show perspective views of the combination anti drain back valve 300 according to the invention. FIGS. 6c-d show perspective views of the two part combination relief valve element 100, including the first part 102 formed of a polymeric material and the second part 202 including the metallic or non metallic disk 204 with openings 206.

Figure 7:
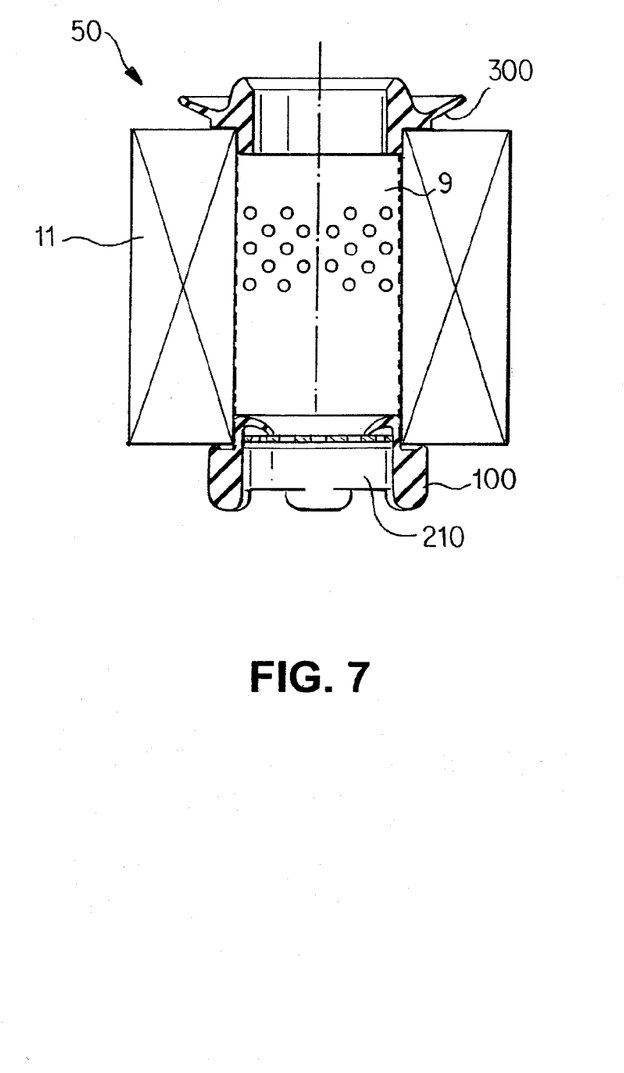
FIG. 7 shows a cross section of the two part bottom support-relief valve-end seal in assembly with a filter element, according to an embodiment of the invention.

FIG. 7 shows the exemplary filter 50 having both the two part combination relief valve element 100, including the bottom supports 110, relief valve portion 210 and end seal formed by the sealing element 112 of first and second parts 102, 202. These components are shown in assembly with the filtering media element 11 in the can 12. FIG. 7 provides a more generalized view of the filter 50 than is provided in FIG. 6 described above. The number of internal components according to the invention is significantly reduced, and the parts shown in the exemplary internal filter element are assembled only using interference fit of parts.

Figure 8E:
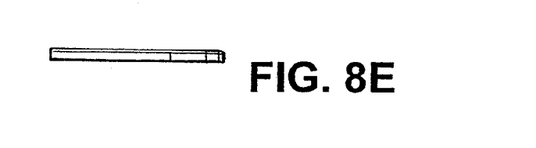
FIG. 8e is a side view showing a second part of the two part bottom support-relief valve-end seal according to an embodiment of the invention.
Figure 8F:
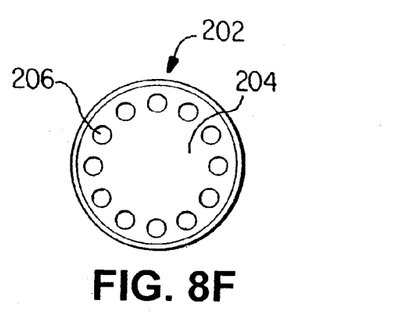
FIG. 8f is a top view of the second part shown in FIG. 8e.
Figure 8G:
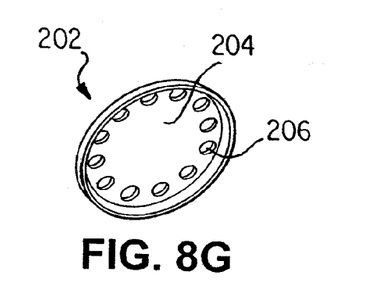
FIG. 8g is a perspective view of the second part shown in FIG. 8e.
Figure 8H:
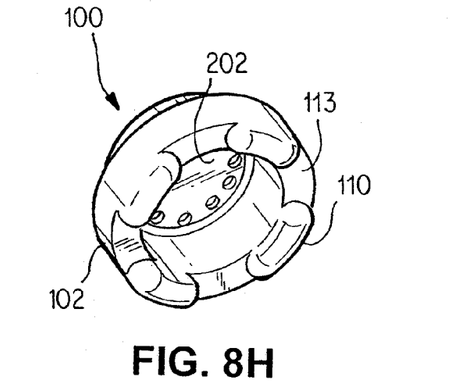

FIGS. 8a-d show various perspective and plan views of an exemplary embodiment of the first part 102 of the two part combination relief valve element 100, with the integrated features of the combination bottom support/end seal with a part of the relief valve portion 210. FIGS. 8e-g show detailed views of the second part 202 of the two part combination relief valve element 100, including the relief valve disc 204. The valve disc 204 is adapted to fit in the first part 102 shown in FIGS. 8a-8d. FIGS. 8h-8l show the complete two part combination relief valve element 100 according to an embodiment of the invention, integrating the first and second parts 102, 202 to form a complete relief valve portion 210.

Figures 8J, 8K, 8L, 9B:
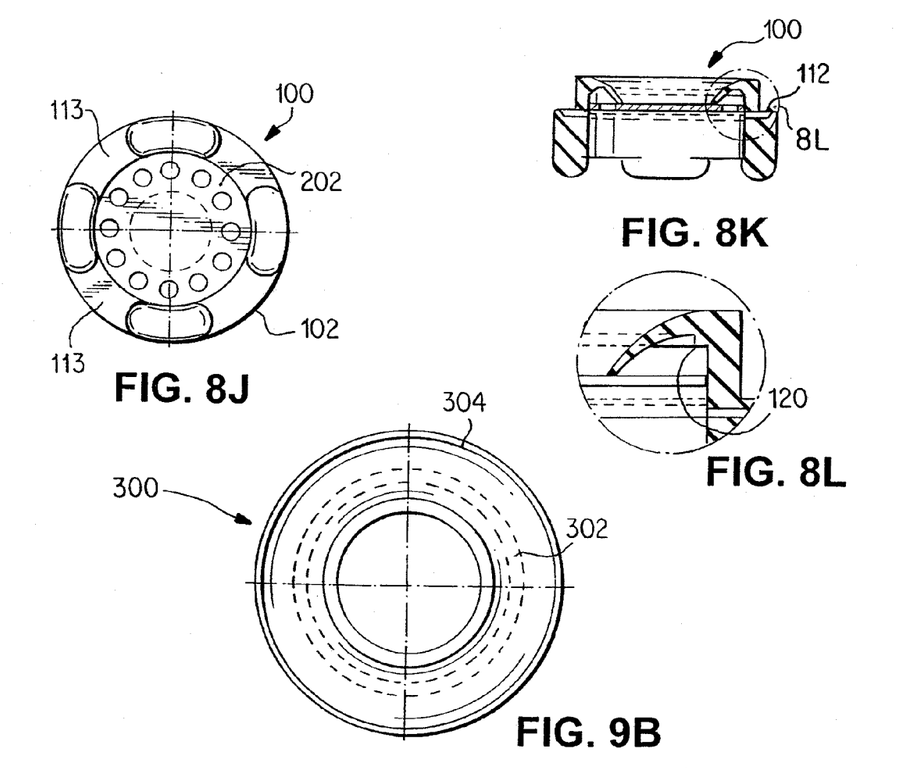
Figure 9A:
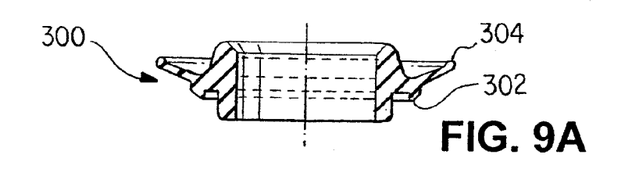

FIGS. 9a-9b show in more detail an exemplary combination anti-drain back valve element 300 according to the invention, having a sealing lip 304 and an anti-drain back flange 302, which can also be included in the exemplary filter 50. The combination anti-drain back valve element 300 may optionally be combined with the two part combination relief valve element 100 according to the invention, to further reduce the parts count and the assembly operations of the filter 50.

Figure 10A:
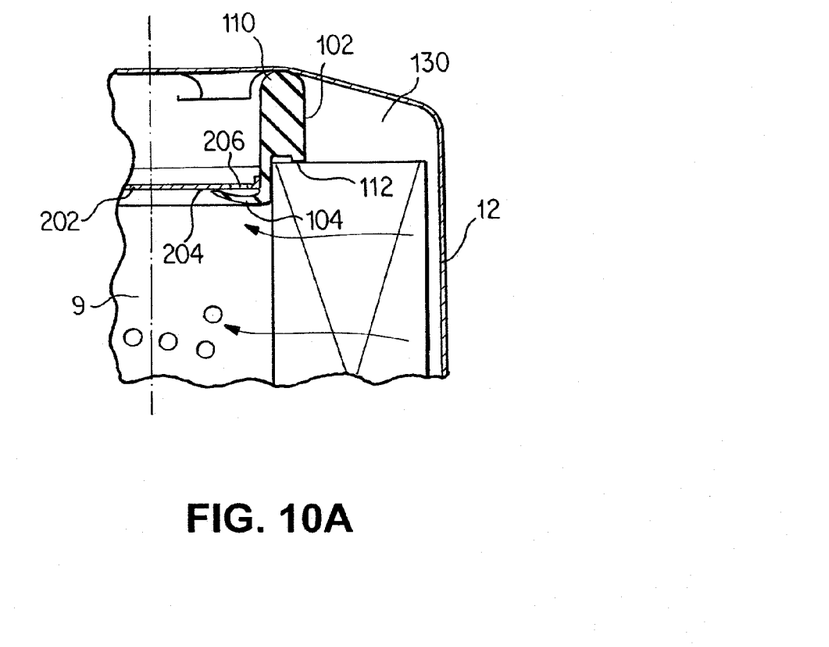
FIGS. 10a-c show detail views of a two part bottom support-relief valve-end seal, respectively in a normal flow condition, a partially restricted flow condition and a fully restricted flow condition, according to an embodiment of the invention.
Figure 10B:
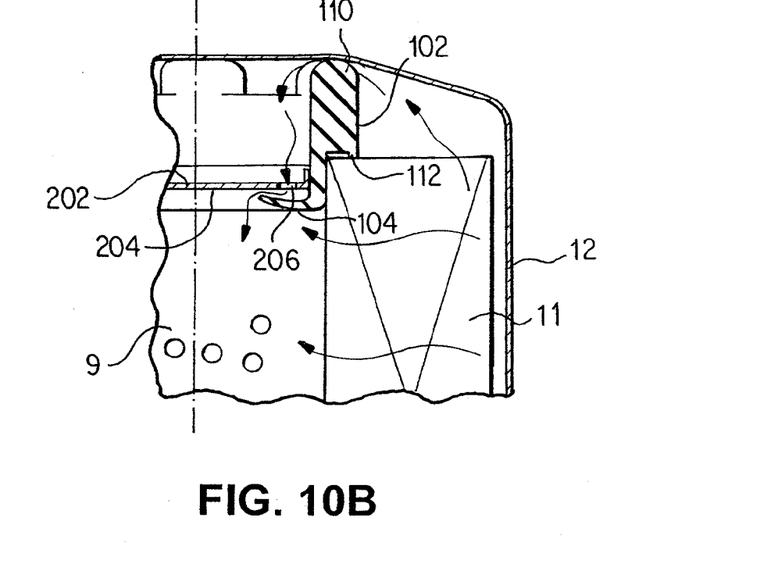
Figure 10C:
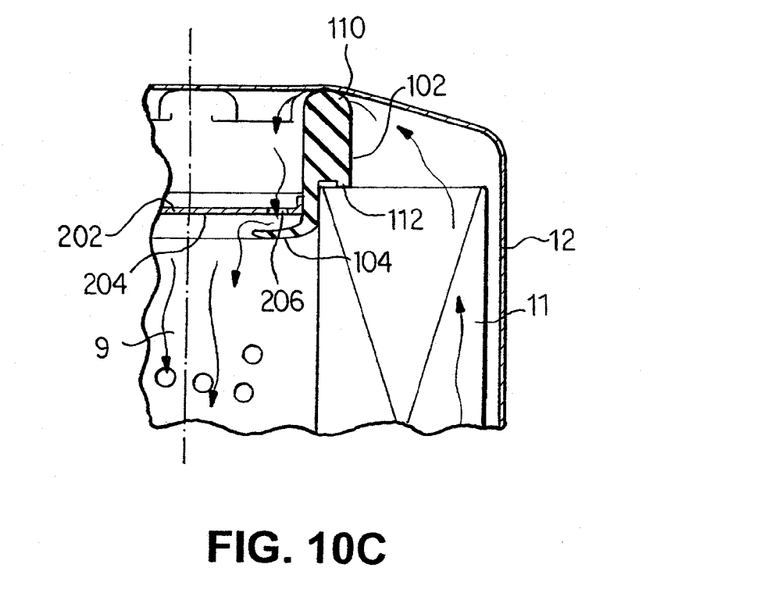

FIGS. 10a-c show enlarged detail views of the two part combination relief valve element 100 corresponding to the overall flow conditions depicted in FIGS. 1-4. More specifically, FIG. 10a depicts the state of the two part combination relief valve element 100 in a normal configuration, obtained for example in a no oil flow condition caused by the engine and/or the fluid pump being off. The same configuration is obtained in a normal flow condition, when the oil flows normally through the filter without restriction. In this condition, the sealing element 112 and the valve sealing lip 104 prevent the unfiltered fluid in the cavity 130 from bypassing the filter media pack 11, and entering in the center tube 9. The fluid thus has to pass through the filter media pack 11 before exiting the filter, under normal operating pressures.

FIG. 10b shows a bypass flow condition of the two part combination relief valve element 100, corresponding to a partial restriction of the filter 50. In this condition, the valve sealing lip 104 begins to open, and a certain amount of unfiltered fluid is permitted to bypass the filter media 11, and to go directly form the cavity 130 to the center tube 9 by way of the orifices 206 of the disc 204.

Another bypass flow condition of the two part combination relief valve element 100 is shown in FIG. 10c. In this condition, the flow results from an extremely restricted state of the filter 50, such that a large amount of unfiltered fluid passes directly from the cavity 130 to the center tube 9. Here, the valve sealing lip 104 is completely deflected away from the surface of the disc 204, allowing the fluid to pass through orifices 206 and largely bypass the filter media 11. This condition could result, for example, from a severe clogging of the filter media 11, which would cause a large pressure differential across the relief valve portion 102. The valve sealing lip 104 may have different degrees of opening depending on the differential pressure resulting from different amounts of restriction. In all the above conditions, the end sealing element 112 formed integrally with the first part 102 of the two part combination relief valve element 100 maintains a seal with the body of the filter 50.

The two part combination relief valve element according to the various exemplary embodiments of the invention provides, among others, the following advantageous features:

1. The exemplary two part combination relief valve element made of resilient material fully replaces multiple other components and processes to assemble them, as described above, thus reducing the number of parts and manufacturing processes required.
2. The shaped RV opening-flow zones 113 and the shape of the support lugs 110 of the two part combination relief valve element that reduces the cumulative assembly stack-up tolerances simplifies accurate manufacturing.
3. The relief valve sealing lip 104 is designed and shaped to open and close in the assembly, based on required pressure differential, to perform the function of a separate relief valve in a conventional filter assembly.
4. The retention area 120 that helps to retain the oil, under off and prolonged off conditions, to prevent locking up of the RV sealing lip 104 with the RV disc 204. The retention area 120 also provides a seat for the RV disc 204.
5. The end seal 112 that provides circumferential line contact with the filter element pack, concentric to an inner diameter of the center tube 9, prevents unwanted flow of the fluid.
6. The RV disc 204 with flow through holes 206 of the second part 202 may be selected with a number and size of openings 206 that provides a desired level of bypass flow under various conditions.

Additionally, the exemplary two part combination relief valve element 100 may include a sealing lip 104 and a sealing element 112 designed to provide sealing between filter components, and to prevent inlet to outlet leakage unless the bypass relief valve is intentionally opened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fluid filter, comprising:
 a filter body defining a cavity containing a filtration element;
 an inlet of the cavity for flowing a fluid into the fluid filter, and an outlet for flowing the fluid out therefrom; and
 a first end cap for fitting on an end of the filter body, having a two part combination relief valve element integrating a relief valve portion, supports for the filtration element and an end sealing element;
 wherein the supports are in contact with the filtration element and the filter body and extend therebetween in a direction substantially parallel to an axial direction of the filter;
 wherein the two part combination relief valve element includes a first part defining a body of the two part combination relief valve element; and a second part having a disk forming part of the relief valve portion, the second part fitting entirely within the first part, wherein the relief valve portion when closed directs the fluid through the filtration element, and when open bypasses at least a portion of the fluid from the filtration element, and wherein the disk is disposed in a central portion between ends of the body of the two part combination relief valve element and the disk has a circular outer circumference, an entirety of the circular outer circumference being seated against an inner wall of the first part of the two part combination relief valve element.

2. The fluid filter according to claim 1, further comprising a second end cap for fitting on an opposite end of the filter body, having an integrated single piece anti drain back valve and seal.

3. The fluid filter according to claim 1, wherein the first part of the two part combination relief valve element is formed of a resilient polymer.

4. The fluid filter according to claim 1, wherein the second part of the two part combination relief valve element is formed of a metal.

5. The fluid filter according to claim 1, further comprising a sealing lip of the relief valve portion forming an annular seal preventing bypass of the filtration element when a fluid pressure is below a pre-determined threshold pressure.

6. The fluid filter according to claim 5, further comprising flow passages disposed between the supports for assisting opening the relief valve portion when a fluid pressure is above a pre-determined threshold pressure.

7. The fluid filter according to claim 1, wherein the relief valve disc of the second part is fit by interference in the relief valve body of the first part.

8. The fluid filter according to claim 1, wherein the two part combination relief valve element further comprises a sealing flange having a sealing element.

9. The fluid filter according to claim 1, wherein the two part combination relief valve element is assembled in the filter body by interference fitting.

10. The fluid filter according to claim 1, wherein the second part comprises a disc having orifices of selected dimensions and number.

11. The fluid filter according to claim 1, wherein the first part comprises a body having supports, a sealing element and a sealing lip cooperating with a perforated disc of the second part to form a relief valve portion.

12. The fluid filter according to claim 1, wherein the relief valve portion of the two part combination relief valve element opens to direct at least a portion of the fluid to bypass the filtration element when a pressure of the fluid is above a pre-determined threshold pressure.

13. The fluid filter according to claim 1, wherein the disk of the second part includes a flat surface in which a plurality of holes are located.

14. A fluid filter, comprising:
a filter body defining a cavity containing a filtering element;
a two part combination relief valve element sealable between inlet and outlet passages of the filter body, for selectively directing a fluid from the inlet passage to at least one of the outlet passage and the filtering element; and a relief valve portion of the two part combination relief valve element openable in response to a pressure differential across the relief valve portion;
wherein the two part combination relief valve element includes a first part having a sealing lip of the relief valve portion, a support portion for supporting a filtering element of the fluid filter, and an end sealing element for sealing the relief valve portion in a filter body; and a second part having a perforated disc of the relief valve portion;
wherein the support portion is in contact with the filtering element and the filter body and extends therebetween in a direction substantially parallel to an axial direction of the filter;
wherein the second part fits entirely within the first part; and
wherein the disk is disposed in a central portion between ends of the body of the two part combination relief valve element and the disk has a circular outer circumference, an entirety of the circular outer circumference being seated against an inner wall of the first part of the two part combination relief valve element.

15. The fluid filter according to claim 14, wherein the relief valve portion remains closed when the pressure differential is below a pre-set pressure differential.

16. The fluid filter according to claim 14, further comprising support lugs of the two part combination relief valve element for supporting the filtering element.

17. The fluid filter according to claim 14, further comprising an end sealing element of the two part combination relief valve element for impeding passage of fluid between the inlet and the outlet.

18. The fluid filter according to claim 14, wherein the two part combination relief valve element, when the pressure differential is above a pre-set pressure differential, allows at least a portion of the fluid to bypass the filtering element.

19. The fluid filter according to claim 14, wherein the first part of the two part combination relief valve element is formed of a resilient polymer.

20. The fluid filter according to claim 14, wherein the second part of the two part combination relief valve element is formed of a metal.

21. The fluid filter according to claim 14, wherein the perforated disc includes a flat surface in which a plurality of holes are located.

22. A two part combination relief valve element for a fluid filter, comprising:
a relief valve portion openable in response to a pressure differential between an inlet and an outlet of the fluid filter;
a first part having a sealing lip of the relief valve portion, a support portion for supporting a filtering element of the fluid filter, and an end sealing element for sealing the relief valve portion in a filter body; and
a second part having a perforated disc of the relief valve portion;
wherein the support portion is configured to be in contact with the filtering element and the filter body and extend therebetween in a direction substantially parallel to an axial direction of the filter;
wherein the second part fits entirely within the first part; and
wherein the disk is disposed in a central portion between ends of a body of the two part combination relief valve element and the disk has a circular outer circumference, an entirety of the circular outer circumference being seated against an inner wall of the first part of the two part combination relief valve element.

23. The relief valve element according to claim 22, wherein the second part is interference fit with the first part.

24. The relief valve element according to claim 22, wherein the perforated disc includes a flat surface in which a plurality of holes are located.

* * * * *